No. 637,179. Patented Nov. 14, 1899.
J. J. STOCKALL, Sr.
SECONDARY ELECTRIC CLOCK.
(Application filed Sept. 12, 1899.)
(No Model.) 3 Sheets—Sheet 1.

No. 637,179. Patented Nov. 14, 1899.
J. J. STOCKALL, Sr.
SECONDARY ELECTRIC CLOCK.
(Application filed Sept. 12, 1899.)
(No Model.) 3 Sheets—Sheet 2.
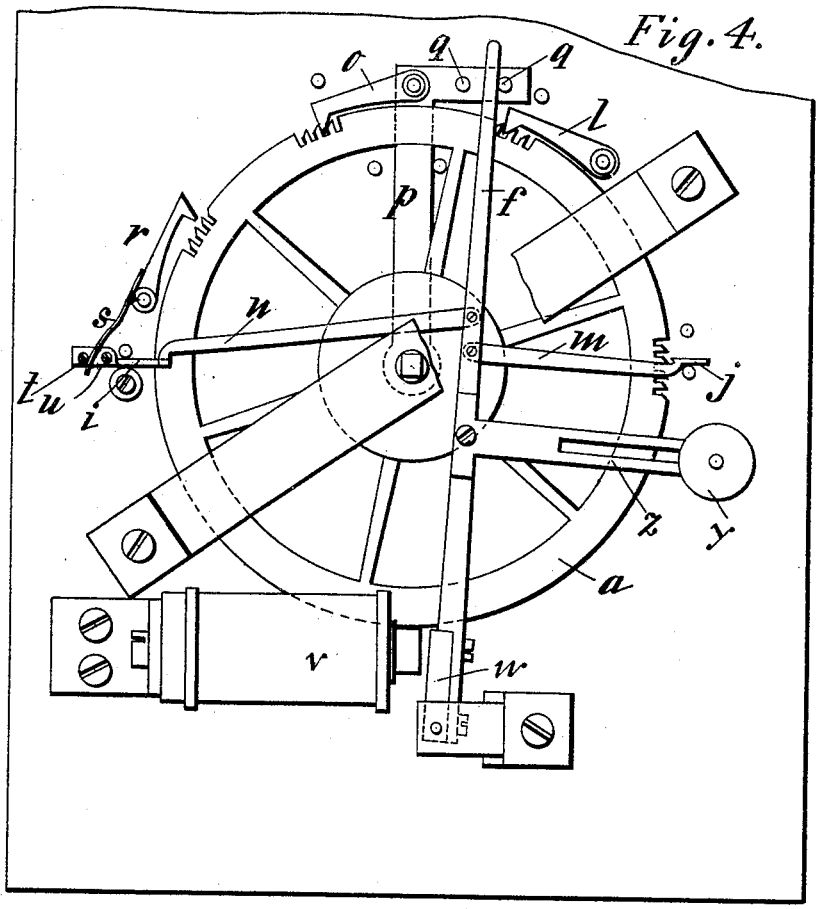
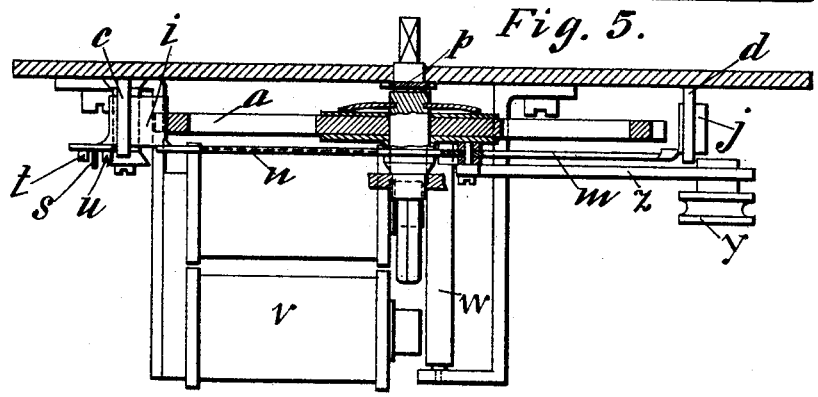

No. 637,179.  
J. J. STOCKALL, Sr.  
SECONDARY ELECTRIC CLOCK.  
(Application filed Sept. 12, 1899.)

Patented Nov. 14, 1899.

(No Model.)

3 Sheets—Sheet 3.

UNITED STATES PATENT OFFICE.

JAMES JOHN STOCKALL, SR., OF LONDON, ENGLAND.

SECONDARY ELECTRIC CLOCK.

SPECIFICATION forming part of Letters Patent No. 637,179, dated November 14, 1899.

Application filed September 12, 1899. Serial No. 730,267. (No model.)

*To all whom it may concern:*

Be it known that I, JAMES JOHN STOCKALL, Sr., a citizen of England, residing at 6 and 8 Clerkenwell road, London, England, have invented a certain new and useful improved apparatus for effecting a step-by-step rotary motion applicable for electric-clock and other machinery requiring accurate control of motion, (for which I have made application for patent in Great Britain, No. 1,394, dated January 20, 1899,) of which the following is a specification.

My invention relates to apparatus worked by a step-by-step rotary or ratchet motion which requires to be accurately controlled, so that at every forward motion of a wheel this shall only be capable of being turned through a definite angle, its motion being then arrested and effectually locked in the position into which it has been moved until the commencement of the next forward impulse. For this purpose I employ the following mechanism: An arm to which a to-and-fro motion is imparted by any suitable means, such as by an electromagnet and spring or weight, has connected to it two pallets adapted to engage on opposite sides of the toothed wheel which is to receive the step-by-step motion. The arm is so connected to these pallets that as it moves in the direction for rotating the wheel it first causes the one pallet to become disengaged from the teeth of the wheel with a radially-sliding motion and at the same time causes the other pallet to engage with the teeth of the wheel on the opposite side with a radially-sliding motion, after which this pallet, by a turning motion, is made to effect the rotation of the wheel through a certain distance, which is limited by a fixed stop against which the pallet strikes. On the return motion of the arm the last-named pallet is moved out of engagement with the wheel and the first-named pallet is at the same time moved into engagement, so that the wheel is effectually locked in position until the above-described action is repeated.

On the accompanying drawings are shown various arrangements for carrying out my said invention.

Figure 1:
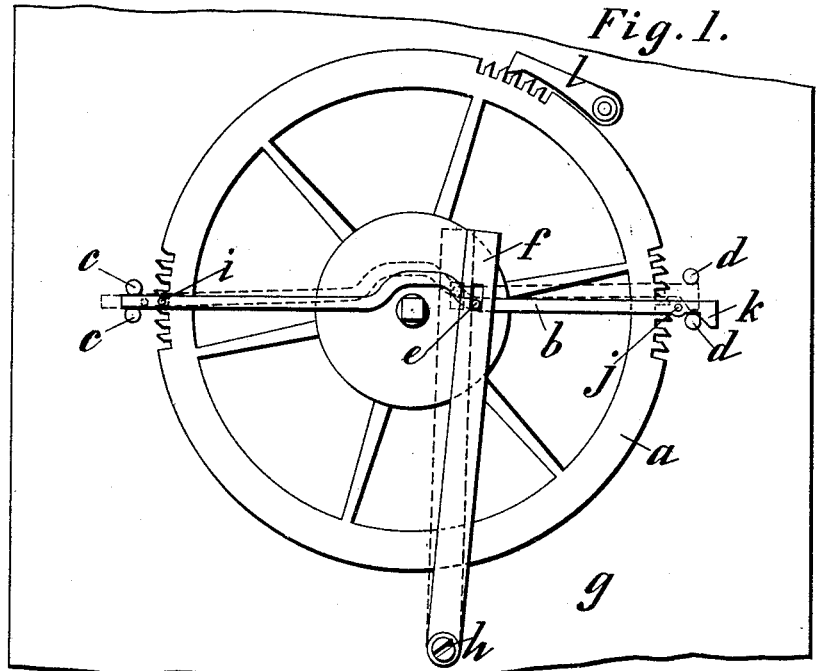
Figure 2:
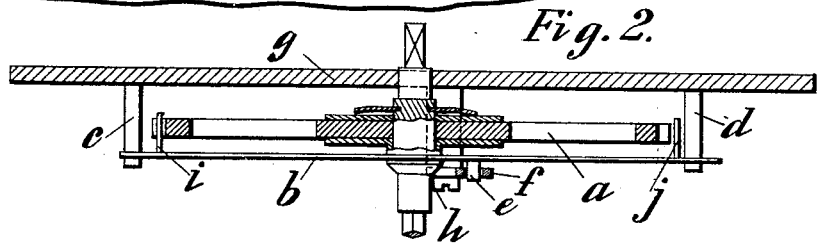
Figure 3:
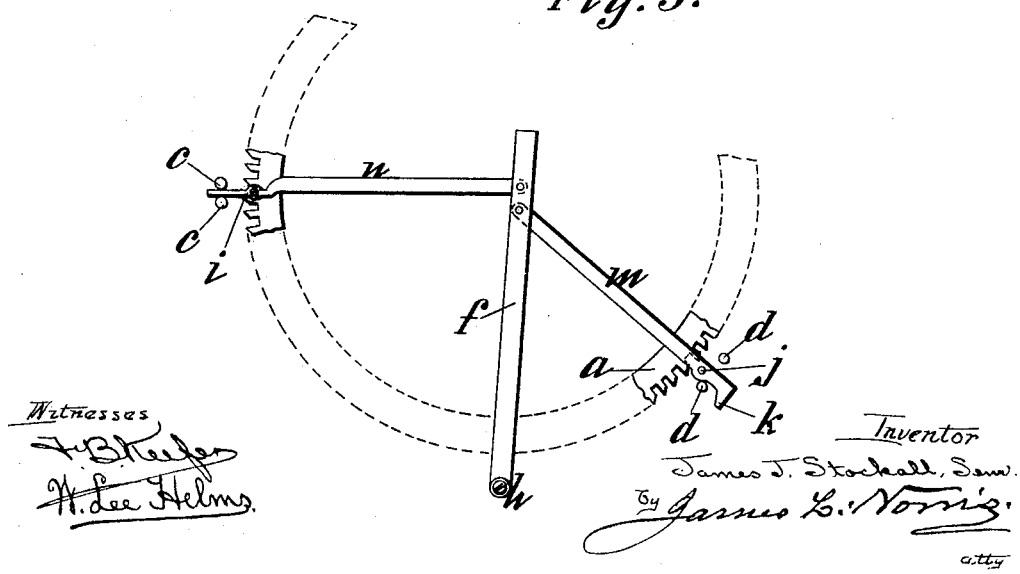
Figure 6:
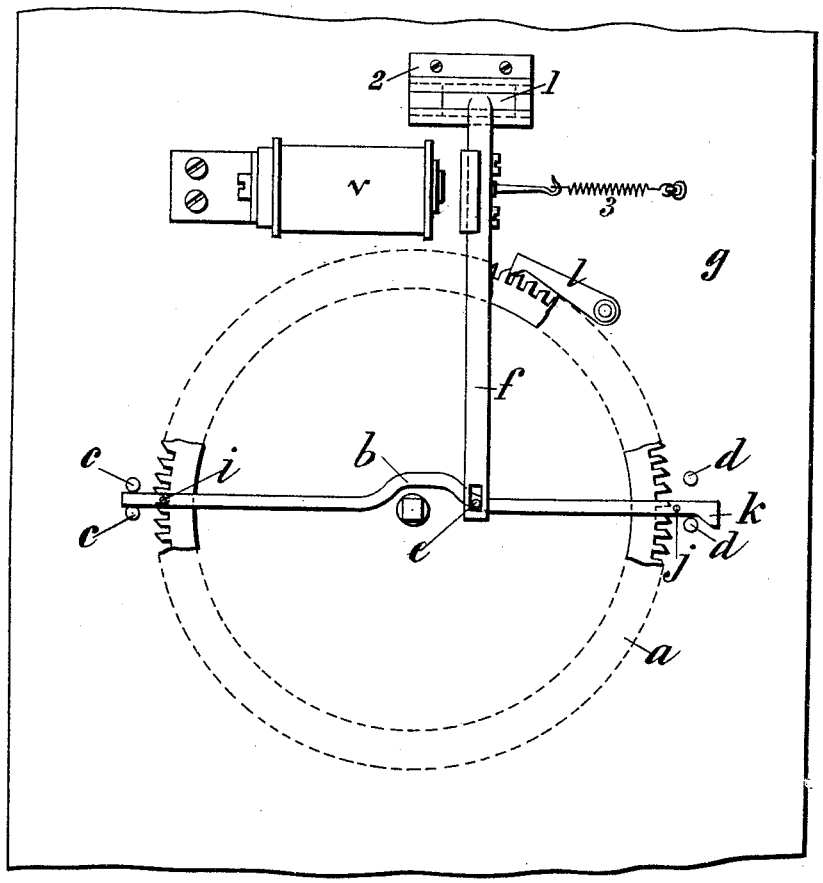

Figures 1 and 2 show, respectively, an elevation and horizontal section of one arrangement. Fig. 3 shows a part elevation of a second arrangement; Figs. 4 and 5, respectively, an elevation and sectional plan of another modification; and Fig. 6 shows a part elevation of a modification in which the pallet-actuating arm is supported above the ratchet-wheel instead of below it.

In the arrangement shown at Figs. 1 and 2, $a$ is the toothed wheel to which a step-by-step rotary motion is to be imparted. In front of this is arranged a horizontal bar $b$, which at the left-hand end works between fixed guide-pins $c$ $c$, so arranged that the bar can slide through them without any vertical play, while the right-hand end works between two other guide-pins $d$ $d$ at a certain distance apart, so that the bar has a certain amount of vertical play. The bar $b$ has a pin $e$ projecting through a slotted hole in an arm $f$, pivoted to the casing $g$ at $h$ and receiving a to-and-fro motion by any suitable means, such as by being attracted at intervals in one direction by an electromagnet and then moved back again by a spring or weight. On each end of the bar $b$ are pallet-pins $i$ and $j$, in such positions relatively to the toothed wheel that when the bar is brought into the position shown in full lines by the backward motion of the arm $f$ the pin $i$ is engaged between the teeth of wheel $a$, and consequently effectually prevents any rotation of the latter, while the pin $j$ is just free of the teeth of the wheel. On the commencement of the forward motion of arm $f$ pin $j$ first comes into engagement with the teeth of wheel $a$ and pin $i$ then moves out of engagement therewith, whereupon on the further motion of the arm $f$ and bar $b$ an incline $k$ on the end of the latter in bearing against the lower guide-pin $d$ causes the bar to rise at that end until it comes in contact with the upper pin $d$. By such rising motion of the bar its pallet-pin $j$ is made to carry the wheel around with it the exact distance determined by the stop-pin $d$. On the arm $f$ and bar $b$ now commencing to move backward the pin $i$ again enters into engagement with the teeth of wheel $a$ before pin $j$ has been brought out of engagement therewith, and consequently the wheel $a$ is again effectually locked in the position into which it has been moved.

It will be seen that in order to allow of the above-described action of the two pallets upon the wheel the teeth of the latter require to be made of considerably greater depth than is necessary for ratchet purposes, as shown, so as to allow of the required extent of motion of the pallets while in engagement with the teeth.

The pawl *l*, pivoted to the framing engaging with the teeth of the wheel *a*, is provided, so as to prevent any possible backward motion thereof during the very short interval before the pin *i* engages with the teeth on the commencement of the backward motion of the bar *b*. On the completion of such backward motion the right-hand end of the bar again drops into its original position ready for the repetition of the above-described action.

Fig. 3 shows a modification of the above arrangement, in which the bar *b* is replaced by two separate bars *m* and *n*, pivoted separately to the arm *f*. The action is otherwise precisely the same as above described.

In the modification shown in elevation and sectional plan at Figs. 4 and 5 the rotary motion of the wheel *a* is not effected by an incline on the pallet *j*, as before, but by a pawl *o*, actuated by the upper end of the arm *f*. The pallets *i* and *j* are here formed as plates instead of pins, the pallet *i* operating in precisely the same manner as before, while the pallet *j* only serves to accurately limit the motion of the wheel *a* in coming against the stop *d* while in engagement with the teeth. The pawl *o* is pivoted to a radial arm *p*, mounted loose on the axis of the wheel *a* and having a tail carrying two pins *q q*, between which the end of the lever *f* has a certain amount of play. The object of this is that the arm *f* must first move a sufficient distance forward for bringing the pallet *i* out of engagement, and the pallet *j* into engagement, with the teeth of the wheel before it moves the arm *p* and pawl *o* forward for turning the wheel through the required distance.

An additional locking of the wheel *a* is effected after it has been turned by a locking-pawl *r*, having a spring-tail *s* situated between two pins *t u* on the bar *n*. When the toothed wheel *a* has completed its forward motion, as described, the pin *u* on bar *n* comes in contact with spring *s*, and thereby throws the pawl *r* into engagement with the teeth of the wheel, while on the backward motion of the arm *f* and pallet *i* the pin *t* throws bar *n* out of engagement as soon as the pallet *i* comes into engagement with the teeth. The arm *f* is here shown actuated in the forward direction by an electromagnet *v*, which is excited by a current at stated intervals of time, so as to attract an armature *w* on the axis of the arm *f*, the return motion being effected by an adjustable weight *y* on an arm *z* projecting from arm *f*.

Although I have in all cases shown the arm *f*, to which the to-and-fro motion is imparted, pivoted to the casing at the lower end, yet it can also be supported at its upper end and the electromagnet or other device for imparting motion thereto be applied at a point above the pallet-bar, as indicated at Fig. 6, where the arm *f* has at its upper end a dovetail block 1, which slides freely in a dovetail guide 2, fixed to the casing *g*, and is actuated in one direction by the electromagnet *v* and in the other direction by a spring 3. The arm is connected to and actuates the pallet-bar *b* and pallet-pins *i j* in precisely the same manner as described with reference to Figs. 1 and 2.

*a* is, as before, the toothed wheel, and *l* is the ratchet-pawl.

My above-described invention is applicable with particular advantage to electric clocks; but it may also be used with advantage in all mechanism in which an accurately-controlled step-by-step rotary motion is required that is effectually locked when each forward motion is completed.

Having thus described the nature of this invention and the best means I know of carrying the same into practical effect, I claim—

1. In apparatus for effecting a step-by-step rotary motion, the combination with a toothed wheel to which a step-by-step rotary motion is to be imparted, of an arm receiving a to-and-fro motion from any suitable power and two pallets actuated by such arm so as to be alternately engaged with opposite sides of said wheel so that the one pallet which only has a to-and-fro motion radially of the said wheel comes into engagement therewith before the other pallet which receives both a radial to-and-fro motion and a circumferential motion is brought out of engagement, substantially as described.

2. In apparatus for effecting a step-by-step rotary motion, the combination of a toothed wheel to which said rotary motion is to be imparted, means for rotating said wheel through a certain distance, a pallet having a to-and-fro motion radially of said wheel only, and adapted to engage therewith when its partial rotation is completed, a second pallet having both a radial and a circular motion adapted to engage with the opposite side of the wheel before it commences its partial rotation, and a fixed stop with which the said second pallet comes in contact when the wheel has completed its motion, and means for imparting the radial motion to the two pallets so that the one always comes into engagement with the wheel before the other passes out of engagement, substantially as described.

3. In apparatus for effecting a step-by-step rotary motion, the combination of a toothed wheel *a* to which rotary motion is to be imparted, a bar *b* having pallets *i* and *j* adapted to slide in and out of engagement with the teeth of the wheel, fixed pins *c c* between which the one end of bar *b* can slide only in a radial direction, pins *d, d* between which the other end of the bar can slide in a radial direction and also turn to a limited extent with the wheel, an arm *f* connected to the bar *b* and receiving a to-and-fro motion by any suitable means, and an incline $k$ on the bar $b$ which in sliding against the one fixed pin $d$, causes the bar to shift upwardly so as to effect the rotation of the wheel $a$ until arrested by the second pin $d$, substantially as described.

In testimony whereof I have hereunto set my hand in presence of two subscribing witnesses.

JAMES JOHN STOCKALL, SENR.

Witnesses:
CHAS. D. ABEL,
A. J. MAXWELL.